United States Patent [19]

Naschberger

[11] Patent Number: 4,606,502

[45] Date of Patent: Aug. 19, 1986

[54] JET NOZZLE

[75] Inventor: Anton Naschberger, Oberau, Austria

[73] Assignee: Johannes Zimmer Gesellschaft m.b.H., Kufstein, Austria

[21] Appl. No.: 373,501

[22] PCT Filed: Aug. 20, 1981

[86] PCT No.: PCT/AT81/00021
§ 371 Date: Apr. 15, 1982
§ 102(e) Date: Apr. 15, 1982

[87] PCT Pub. No.: WO82/00604
PCT Pub. Date: Mar. 4, 1982

[30] Foreign Application Priority Data

Aug. 21, 1980 [AT] Austria .................................. 4269/80

[51] Int. Cl.⁴ ........................... B05B 1/32; B05B 1/30; F16K 31/08
[52] U.S. Cl. ............................... 239/585; 251/129.07; 251/129.1; 251/129.16

[58] Field of Search ................ 239/585; 251/129, 140, 251/141, 129.01, 129.02, 129.07, 129.15, 129.16, 129.17, 129.22, 129.09, 129.1

[56] References Cited

U.S. PATENT DOCUMENTS 3,606,241  9/1971  Bornholdt .................... 251/129 X
4,142,684  3/1979  Schweitzer ...................... 239/585
4,203,554  5/1980  Zimmer et al. .................. 239/585

Primary Examiner—Andres Kashnikow
Attorney, Agent, or Firm—Karl F. Ross; Herbert Dubno

[57] ABSTRACT

In a jet nozzle for applying dyes or the like in a pattern or a precise dosing of liquids, onto a material the nozzle mouth piece (6) is closed by a needle (7, 18, 28) actuated by a magnetic system (10, 20, 11, 21). To this effect the needle (7, 18, 28) passes the magnetic system (10, 20, 11, 21) and is connected to another diaphragm (26) which defines an upper chamber (29) containing a dye and which is connected to the second chamber (19) containing a dye, for guiding the needle (7, 18, 28) within the space defined by the diaphragms (16, 26) diaphragm discs (33, 34) being provided.

6 Claims, 1 Drawing Figure

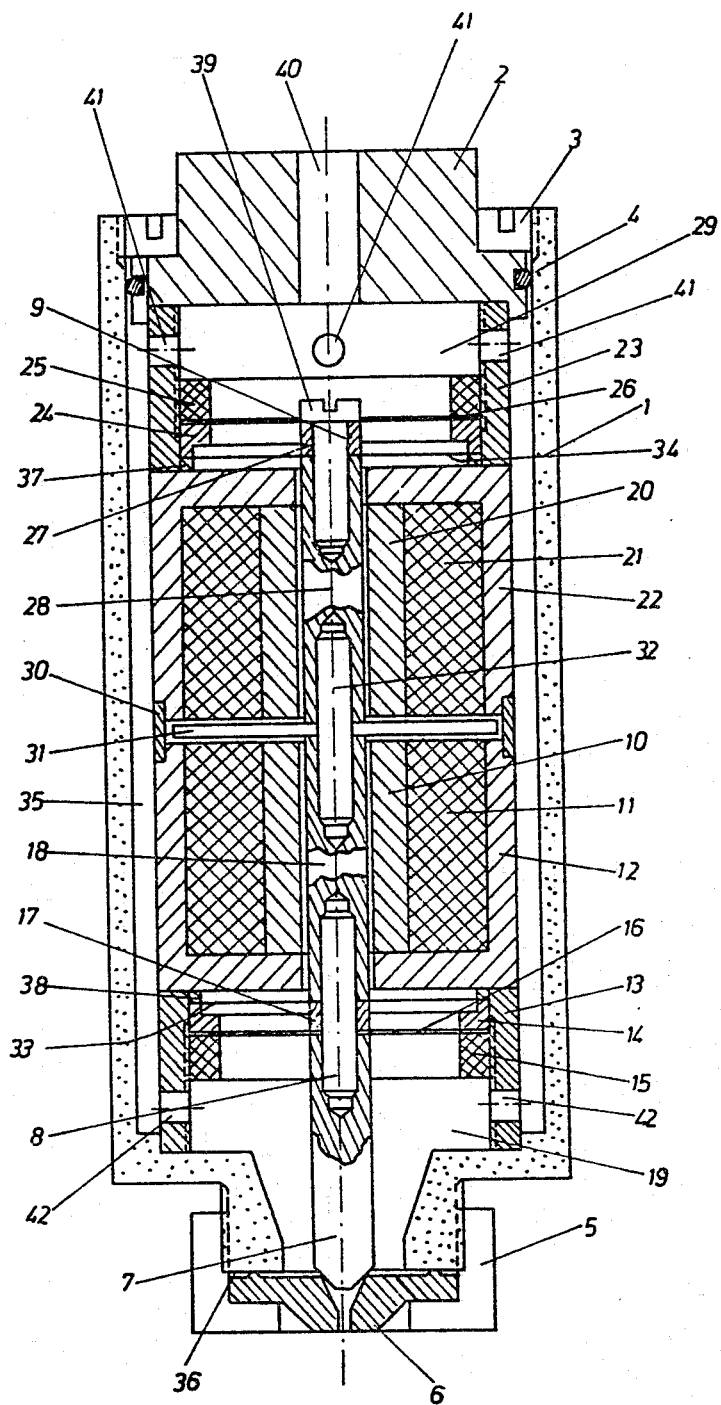

JET NOZZLE

CROSS REFERENCE TO RELATED APPLICATIONS

This application is a national phase application of Patent Cooperation Treaty Application PCT/AT 81/0021 filed 20 Aug. 1981 and claiming the priority of the Austrian National Application A 4269/80 filed 21 Aug. 1980.

FIELD OF THE INVENTION

The invention relates to a jet nozzle for applying dyes or the like in a pattern with a precise dosing of liquids, onto a substrate, especially onto a web of material, the nozzle having a needle closing the nozzle mouth and being guided by a diaphragm, and having a magnet system for moving the needle.

BACKGROUND OF THE INVENTION

Printing methods using stencils and impression print rollers for printing on webs of materials have been known for some time. Recently possibilities have also been proposed to provide webs of material with a printing pattern using controlled liquid jets without using a screen stencil. The jet nozzles delivering the controlled liquid jets must operate in a very exact way and must open and close very quickly.

SUMMARY OF THE INVENTION

In accordance with the invention a jet nozzle has a needle which passes the magnet system and is connected to a further diaphragm above the magnet system which further diaphragm closes an upper chamber containing dye, both chambers containing dye are communicating, and for guiding the needle within the space bounded by the diaphragms discs are provided. The jet nozzle of the invention ensures a better guiding of the needle, and it is not necessary to provide for a pressure equilization in the space between the two diaphragms by a spring or by pressurized air. Possible variations of pressure have no influence on the opening and closing movement of the needle. The two rubber diaphragms enclose an air cushion effecting an equilization on short pressure pulses. Thus values connected in parallel to a liquid supply do not influence each other.

BRIEF DESCRIPTION OF THE DRAWING

The sole FIGURE of the drawing shows a section of the jet nozzle according to the invention.

SPECIFIC DESCRIPTION

The jet nozzle has an external casing 1 closed by a cover 2 at one end. This cover 2 is fixed to the casing 1 by a threaded ring 3. Between the casing 1 and the cover 2 there is a seal 4. At its lower end the casing 1 is provided with a nozzle mouth piece 6 which is pressed against a plane bearing face 36 of the casing 1 by means of a fixing sleeve 5. It is advantageous if the lower end of the casing 1 has an external thread engaged by an internal thread of sleeve 5. In the interior of casing 1 there is a magnet system consisting of two portions. The lower portion consists of a housing 12 wherein a coil 11 is provided. At the center the coil 11 surrounds a permanent magnet 10. The upper portion of the magnet system has a housing 22, a coil 21 and a permanent magnet 20. The two housings 12, 22 are connected to each other by a separating ring 30. The height of this separating ring 30 gives the distance between the two portions of the magnet system. In the gap between the two portions there is an armature disc 31, which can consist of laminated dynamo sheet metal.

The magnet system is transversed by the needle consisting, in the present case, of three portions 7, 18 and 28. The portion 7 is connected to the portion 18 by way of a threaded insert 8, a spacer sleeve 17 being provided between the portions 7 and 18. The portions 18 and 28 of the needle are connected to each other by way of a threaded insert 32. The armature disc 31 is rigidly connected to the needle at the connection points of the portions 18 and 28.

On the housing 22 of the upper magnet system there rests a support ring 23 which if desired might also be fixed to the housing for instance by an adhesive. Rings 24, 25 are inserted into the support 23, at least one of which, i.e. the ring 25, has an external thread. A rubber or plastic diaphragm 26 is fixed between the threaded ring 25 and the ring 24 whereas a diaphragm disc 34 is clamped between the ring 24 and an extension 37 of the support 23. A similar structure is also provided for the lower magnet system. Here a support 13 rests on the housing 12, into which support a ring 15 is threaded and a ring 14 is inserted. A rubber or plastic diaphragm 16 is fixed between the rings 14 and 15, whereas a further guide diaphragm is clamped between the ring 14 and an extension 38 of the support 13.

Both the guide diaphragms 33, 34 consist of thin metal sheet and their thickness is not more than 1% of their diameter. Moreover, these diaphragm discs might have radial incisions which permit deflection of the centre of the diaphragm discs in relation to its periphery of a few tenths of a millimeter to be produced by small forces. These diaphragm disc center the needle strictly with respect to the cone of the nozzle mouth piece 6 to ensure thereby an exact opening and a precise sealing in the closed position of the jet nozzle.

The rubber or plastic diaphragms 16, 26 are provided to seal off each a chamber 19 or 29 containing a dye, from the magnet system. As can be taken from the drawing the rubber or plastic diaphragm 16 is clamped between the lower portion of the needle 7 and the distance sleeve 17 and the diaphragm disc 33 is kept between the distance sleeve 17 and the middle portion 18 of the needle. To connect the diaphragm disc 34 and the rubber or plastic diaphragm 26 to the needle too, a further distance sleeve 27 is put onto the upper end of the needle which sleeve is depressed by a threaded bolt 9. The diaphragm disc 34 is then supported between the upper needle portion 28 and the distance sleeve 27 and the rubber or plastic diaphragm 26 between the head 39 of the bolt 9 and the distance sleeve 27. Thereby, the chamber containing the magnet system is completely sealed off from the two dye chambers 19 and 29 and additionally a precise guidance of the needle is ensured. The dye to be sprayed is inserted into the upper dye chamber 29 by way of a bore 40 in the cover 2 and passes from here by way of apertures 41 into an annular chamber 35 being provided between the casing 1 and the unity formed by the support 13, housing 12, distance ring 30, housing 22 and support 23, and is then passed by way of apertures 42 into the lower dye chamber 19.

On account of the fact that the rubber or plastic diaphragms 26 and 16 have essentially the same area it is not necessary to look for an equilization of the pressure for the space between these two diaphragms. The two rubber diaphragms enclose an air cushion providing an equilization with short pressure pulses. Accordingly valves being in parallel to the liquid supply, do not influence each other. This is an essential advantage as it is not necessary to provide separate supply lines for pressurized air and measuring devices. The pressure of the liquid might be between 0 and 10 bar. The needle would be in balance on account of the equal areas of the rubber or plastic diaphragms 16, 26 if there is not acting an additional force on account of permanent magnets 10, 20. The effect of the permanent magnets 10, 20 is lessened or increased by an electric pulse passing the windings 11 and 21 resp. As the windings 11, 21 are connected in opposite way, for instance the effect of the upper magnets is increased whereas the effect of the lower magnets is lessened, the armature disc 31 together with the needle being moved towards the stronger magnet. After the termination of the pulse the armature disc is further influenced by the permanent magnets. This has the advantage that an energy supply is necessary in the moment of the closing of the needle, only, but no energy is necessary to keep the needle in one position. It should be pointed out that by the measurements of the invention all thermical problems have been removed. It is obvious that by changing the spacer sleeve 30 the lifting of the needle easily can be altered. The length of the needle might be altered by changing the spacer sleeve 30 too, thus the jet nozzle according to the invention might easily be adjusted to the requirements. A variation of the magnet system might consist in the provision that the core of the magnet is made of soft iron instead of a permanent magnet. Then the magnetic force is given by a continuous current passing the windings 11 or 21.

I claim:

1. A jet nozzle for high speed actuation in the application of a dye to a substrate, said nozzle comprising:
   a housing formed with a nozzle orifice;
   a magnet system in said housing including at least one electromagnet energizable for the selective opening and closing of said orifice;
   a needle in said housing traversing said magnet system and engageable in said orifice to block the same, said needle being retractable by said magnet system from said orifice to open said orifice;
   a first sealing diaphragm bridged between said housing and said needle proximal to said orifice and defining in said housing a first compartment between said first sealing diaphragm and said orifice;
   a second sealing diaphragm bridged between said needle and said housing remote from said orifice for defining a second compartment within said housing whereby said diaphragms separate said compartments from said magnet system and said magnet system is located between said sealing diaphragms, said diaphragms having the same areas;
   means for feeding said dye to one of said compartments and a passage formed in said housing communicating between said compartments whereby said dye fills said compartments with pressure equalization on opposite sides of the two diaphragms in a blocked condition of said orifice; and
   a pair of guide discs fixed in said housing and engaging said needle at axially spaced locations between said diaphragms for guiding said needle in said housing in said magnet system.

2. The nozzle defined in claim 1 wherein said discs are each spaced from a respective one of said diaphragms by a respective spacer sleeve.

3. The nozzle defined in claim 2 wherein said discs are slotted metal discs.

4. The nozzle defined in claim 1 wherein said magnet system comprises a pair of electromagnet coils axially spaced in said housing, respective permanent magnets surrounded by said coils, and an armature disc carried by said needle and disposed between said electromagnets and the respective permanent magnets.

5. The nozzle defined in claim 4 wherein said needle comprises a plurality of axially aligned portions interconnected by threaded inserts and at least one spacer sleeve interposed between two of said portions.

6. The nozzle defined in claim 4 wherein each of said electromagnets and the respective permanent magnet is received in a respective magnet housing member, said magnet housing members being spaced apart by a respective spacer sleeve, said magnetic housing members supporting walls of said compartments.

* * * * *